United States Patent
Chinitz et al.

(10) Patent No.: US 10,267,402 B2
(45) Date of Patent: Apr. 23, 2019

(54) AXLE ASSEMBLY HAVING A DRIVE PINION AND A BEARING PRELOAD ELEMENT

(71) Applicant: ArvinMeritor Technology, LLC, Troy, MI (US)

(72) Inventors: Steven Chinitz, Plymouth, MI (US); Dale Eschenburg, Rochester Hills, MI (US); Aniruddh P. Annigeri, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 64 days.

(21) Appl. No.: 15/455,369

(22) Filed: Mar. 10, 2017

(65) Prior Publication Data

US 2018/0259051 A1 Sep. 13, 2018

(51) Int. Cl.
*F16H 48/42* (2012.01)
*F16H 48/08* (2006.01)
*B60K 17/16* (2006.01)
*F16H 57/037* (2012.01)
*F16H 48/06* (2006.01)
(Continued)

(52) U.S. Cl.
CPC ............. *F16H 48/42* (2013.01); *B60B 35/18* (2013.01); *B60K 17/16* (2013.01); *B60K 23/04* (2013.01); *F16C 19/548* (2013.01); *F16C 25/06* (2013.01); *F16H 48/06* (2013.01); *F16H 48/08* (2013.01); *F16H 57/037* (2013.01); *B60B 35/121* (2013.01); *B60B 35/122* (2013.01); *F16C 19/364* (2013.01); *F16C 2226/60* (2013.01); *F16C 2361/61* (2013.01); *F16H 2048/405* (2013.01); *F16H 2048/423* (2013.01); *F16H 2048/426* (2013.01); *F16H 2057/0221* (2013.01)

(58) Field of Classification Search
CPC .......... F16H 48/06; F16H 48/08; F16H 48/42; F16H 2048/405; F16H 2048/423; F16H 2048/426; F16H 57/037; B60K 23/04; B60K 17/16
USPC .................................................. 475/220, 230
See application file for complete search history.

(56) References Cited

U.S. PATENT DOCUMENTS 1,183,283 A 5/1916 Dodge et al.
4,054,999 A * 10/1977 Harbottle .............. F16C 19/364
29/407.06

(Continued)

FOREIGN PATENT DOCUMENTS

AU 2006200842 A1 7/2006
AU 2007200331 A1 8/2007
(Continued)

OTHER PUBLICATIONS

Meritor Heavy Vehicle Systems, LLC, "Maintenance Manual 5A Single-Reduction Differential Carriers," revised Oct. 2015, Meritor Heavy Vehicle Systems, LLC, Troy, Michigan.

(Continued)

*Primary Examiner* — Leslie A Nicholson, III
(74) *Attorney, Agent, or Firm* — Brooks Kushman P.C.

(57) ABSTRACT

An axle assembly having a drive pinion that may be rotatably supported by first and second sets of roller bearing elements. A preload element may exert a preload force on at least one of the first and second sets of roller bearing elements. The preload element may be disposed on the drive pinion in an inboard direction from the yoke.

20 Claims, 11 Drawing Sheets

(51) Int. Cl.
    *B60K 23/04*     (2006.01)
    *B60B 35/18*     (2006.01)
    *F16C 19/54*     (2006.01)
    *F16C 25/06*     (2006.01)
    *F16H 48/40*     (2012.01)
    *B60B 35/12*     (2006.01)
    *F16H 57/022*     (2012.01)
    *F16C 19/36*     (2006.01)

(56) References Cited

U.S. PATENT DOCUMENTS

| | | | | |
|---|---|---|---|---|
| 4,210,372 | A * | 7/1980 | McGee | B60B 3/14 |
| | | | | 180/9.62 |
| 4,754,847 | A * | 7/1988 | Glaze | B60K 17/16 |
| | | | | 184/6.12 |
| 4,812,094 | A * | 3/1989 | Grube | F16B 39/10 |
| | | | | 301/111.01 |
| 4,918,324 | A * | 4/1990 | Isozumi | F02N 15/046 |
| | | | | 290/48 |
| 5,125,156 | A * | 6/1992 | Witte | B25B 23/14 |
| | | | | 29/407.03 |
| 5,560,687 | A * | 10/1996 | Hagelthorn | B60B 27/001 |
| | | | | 301/105.1 |
| 6,189,413 | B1 * | 2/2001 | Morse | B60K 17/16 |
| | | | | 74/607 |
| 6,702,472 | B2 | 3/2004 | Sera et al. | |
| 6,761,237 | B2 * | 7/2004 | Brissette | F16D 1/0864 |
| | | | | 180/24.12 |
| 6,971,802 | B2 * | 12/2005 | Vezina | F16C 25/08 |
| | | | | 384/517 |
| 7,303,367 | B2 | 12/2007 | Rode | |
| 7,389,579 | B2 * | 6/2008 | Rode | B25B 27/062 |
| | | | | 29/724 |
| 7,559,135 | B2 | 7/2009 | Rode | |
| 7,625,164 | B2 | 12/2009 | Rode | |
| 8,100,775 | B2 * | 1/2012 | Hirai | B60B 27/0005 |
| | | | | 403/280 |
| 8,316,530 | B2 | 11/2012 | Rode | |
| 8,359,733 | B2 | 1/2013 | Rode | |
| 8,616,779 | B2 * | 12/2013 | Liu | B60B 27/0026 |
| | | | | 384/544 |
| 8,650,757 | B2 | 2/2014 | Rode | |
| 8,745,875 | B1 * | 6/2014 | Hagelthorn | F16C 41/008 |
| | | | | 29/724 |
| 8,893,364 | B2 | 11/2014 | Rode | |
| 8,904,646 | B2 | 12/2014 | Rode | |
| 8,961,090 | B2 | 2/2015 | Rode | |
| 9,133,926 | B2 | 9/2015 | Hayes et al. | |
| 9,200,672 | B2 | 12/2015 | Rode | |
| 9,200,673 | B2 | 12/2015 | Rode | |
| 9,217,461 | B2 | 12/2015 | Rode et al. | |
| 9,243,704 | B2 * | 1/2016 | Trost | F16H 48/34 |
| 9,618,050 | B2 * | 4/2017 | Schnebele | F16D 1/04 |
| 9,797,441 | B2 * | 10/2017 | Rode | B25B 27/062 |
| 2016/0038994 | A1 | 2/2016 | Leicht | |
| 2016/0116048 | A1 | 4/2016 | Yu | |

FOREIGN PATENT DOCUMENTS

| | | |
|---|---|---|
| AU | 2007234534 A1 | 12/2007 |
| AU | 2008201252 A1 | 4/2008 |
| AU | 2011204889 A1 | 8/2011 |
| CA | 2576337 A1 | 7/2007 |
| CA | 2537611 A1 | 8/2007 |
| DE | 102008061112 A1 | 6/2010 |
| DE | 102011107556 A1 | 1/2013 |
| GB | 2435499 B | 1/2008 |
| GB | 2445501 B | 8/2008 |
| GB | 2434621 B | 10/2008 |
| JP | S58207546 A | 3/1983 |
| JP | 2004316731 A | 11/2004 |
| WO | 2006092256 A1 | 9/2006 |

OTHER PUBLICATIONS

European Patent Office, Extended European Search Report for Application No. 18153813.3-1013, dated Jul. 18, 2018, 12 pages.
Australian Government/IP Australia, Examination Report No. 1 for Australian Patent Application No. 2018200609, dated Nov. 27, 2018.

* cited by examiner

AXLE ASSEMBLY HAVING A DRIVE PINION AND A BEARING PRELOAD ELEMENT

TECHNICAL FIELD

This disclosure relates to an axle assembly having a drive pinion and a bearing preload element.

BACKGROUND

A pinion assembly that may be part of an axle assembly is disclosed in U.S. Patent Publication No. 2016/0116048.

SUMMARY

In at least one embodiment an axle assembly is provided. The axle assembly may have a housing, a drive pinion, a first set of roller bearing elements, a second set of roller bearing elements, a yoke, a yoke retainer, and a preload element. The drive pinion may be rotatable about an axis with respect to the housing. The drive pinion may include a gear portion and a shaft portion that extends from the gear portion. The first set of roller bearing elements may be disposed in the housing. The second set of roller bearing elements may be disposed in the housing between the first set of roller bearing elements and the gear portion. The first and second sets of roller bearing elements may rotatably support the shaft portion of the drive pinion. The yoke may be at least partially disposed outside the housing. The yoke may receive the shaft portion. The yoke retainer may couple the yoke to the shaft portion. The preload element may exert a preload force on at least one of the first set of roller bearing elements and the second set of roller bearing elements. The preload element may be disposed on the drive pinion in an inboard direction from the yoke. The inboard direction may be a direction that extends along the axis from the yoke toward the gear portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
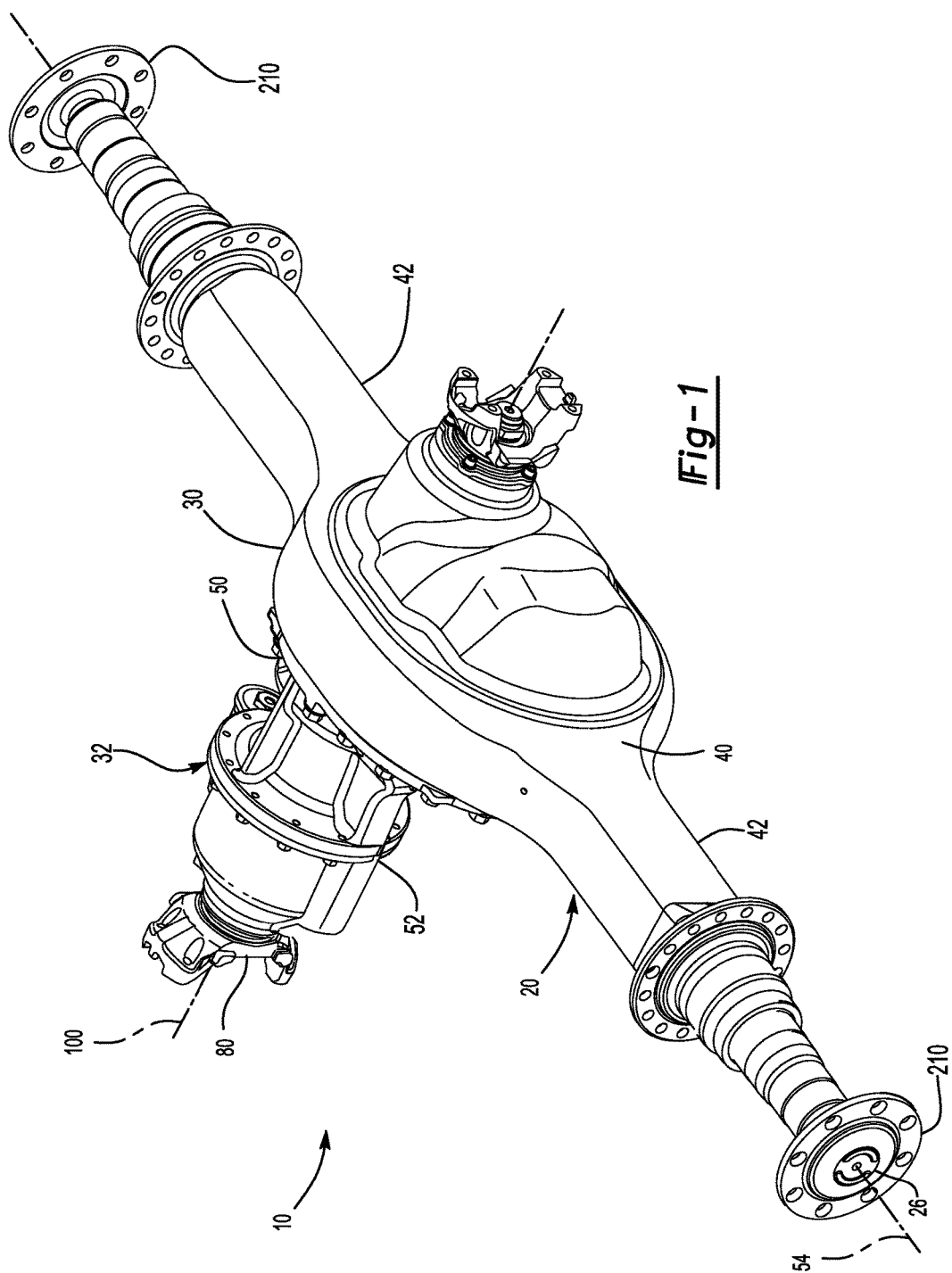
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. For example, two axle assemblies may be provided in a tandem axle configuration. The first axle assembly or axle assembly that is first in the series may be referred to as a forward-rear axle assembly. The second axle assembly may be referred to as a rear-rear axle assembly. An output of the first axle assembly may be selectively coupled to an input of the second axle assembly, such as with a prop shaft. The axle assembly 10 may be a front-rear axle assembly or a rear-rear axle assembly.

Figure 2:
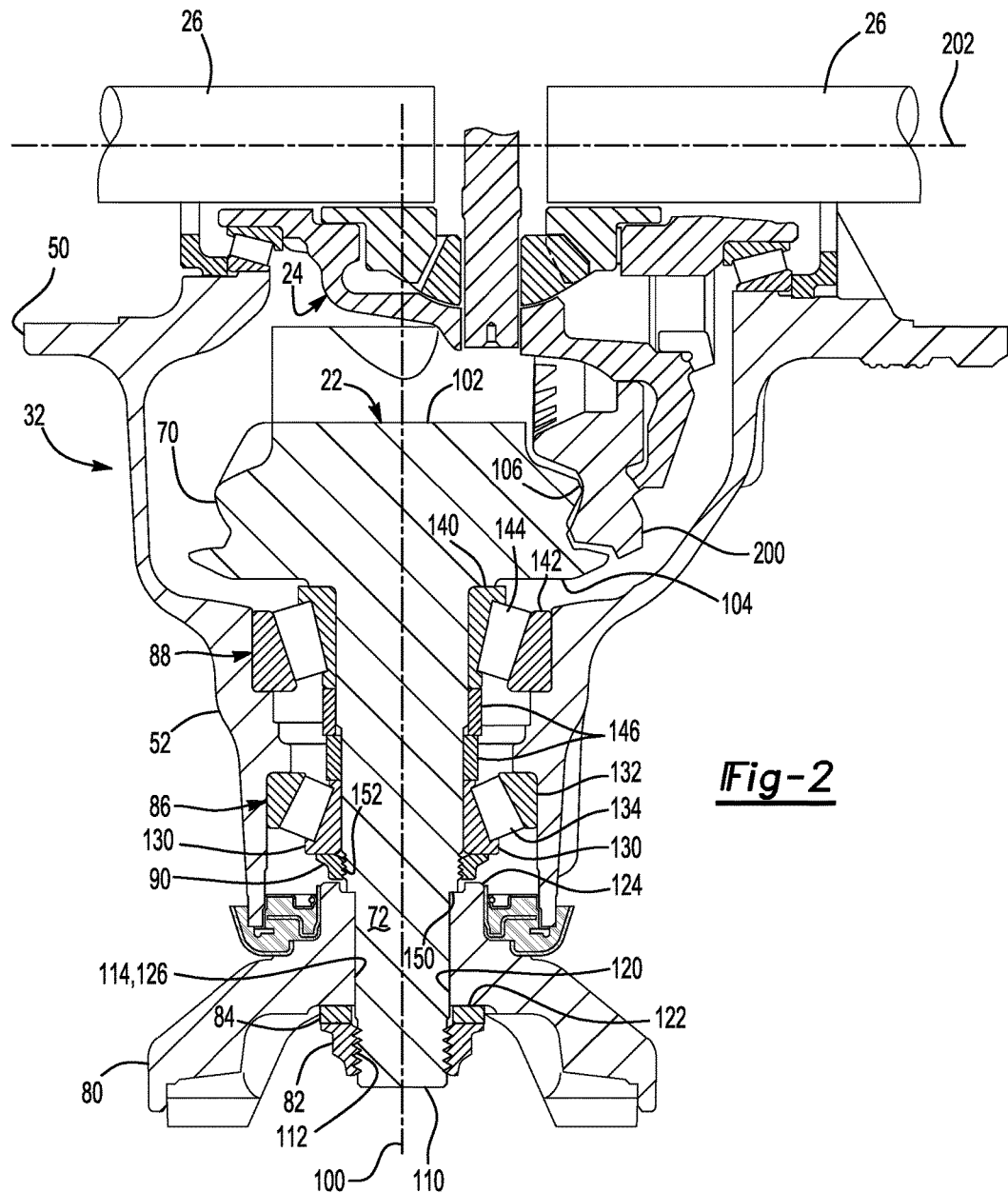
FIGS. 2-4 are section views of a portion of the axle assembly having a drive pinion with a one-piece configuration.

As is best shown with reference to FIGS. 1 and 2, the axle assembly 10 may include a housing 20, a drive pinion 22, a differential assembly 24, and at least one axle shaft 26.

Referring to FIG. 1, the housing 20 may receive various components of the axle assembly 10. In addition, the housing 20 may facilitate mounting of the axle assembly 10 to the vehicle. The housing 20 may include an axle housing 30 and a differential carrier 32.

The axle housing 30 may receive and support the axle shafts 26. In at least one embodiment, the axle housing 30 may include a center portion 40 and at least one arm portion 42.

The center portion 40 may be disposed proximate the center of the axle housing 30. The center portion 40 may define a cavity that may receive the differential assembly 24. The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 24. The arm portions 42 may have substantially similar configurations. For example, the arm portions 42 may each have a hollow configuration or tubular configuration that may extend around the corresponding axle shaft 26 and may help separate or isolate the axle shaft 26 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 26.

Referring to FIGS. 1 and 2, the differential carrier 32, which may also be called a carrier housing, may be mounted to the center portion 40 of the axle housing 30. The differential carrier 32 may rotatably support the differential assembly 24. As is best shown in FIG. 2, the differential carrier 32 may have a flange portion 50 and a body portion 52.

Referring to FIGS. 1 and 2, the flange portion 50 may facilitate mounting of the differential carrier 32 to the axle housing 30. For example, the flange portion 50 may be disposed on the carrier mounting surface of the axle housing 30 and may have a set of holes that may receive fasteners as previously discussed.

The body portion 52 may extend from the flange portion 50. For example, the body portion 52 may extend from the flange portion 50 in a direction that extends away from the differential assembly 24 and the axle housing 30. As such, the body portion 52 may be partially or completely disposed outside of the axle housing 30. The body portion 52 may be generally configured as a hollow structure that may at least partially receive the drive pinion 22.

Referring to FIG. 2, the drive pinion 22 may receive torque from a torque source, such as an engine, motor, transmission, or transfer case. For instance, the drive pinion 22 may be operatively connected to a drive shaft that may be coupled to an output of a vehicle transmission or transfer case, which in turn may receive torque from a vehicle power source, such as an engine or motor. Alternatively, the drive pinion 22 may be operatively connected to an output of another axle assembly.

The drive pinion 22 may include a gear portion 70 and a shaft portion 72. In addition, various features or components may be associated with the drive pinion 22, such as a yoke 80, a yoke retainer 82, a washer 84, a first roller bearing assembly 86, a second roller bearing assembly 88, and a preload element 90. The drive pinion 22 may be made of any suitable material, such as a metal alloy.

Figure 3:
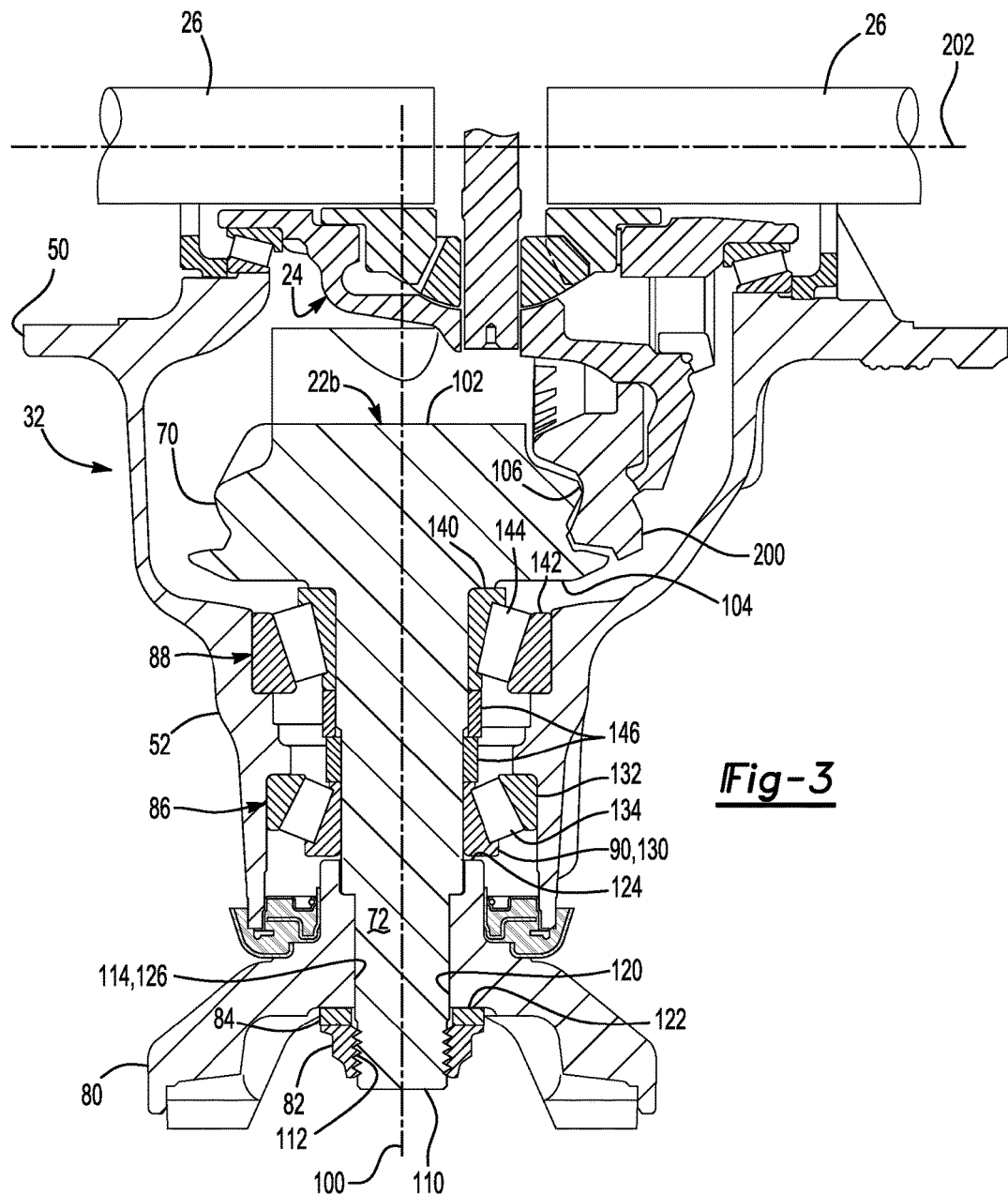
Figure 4:
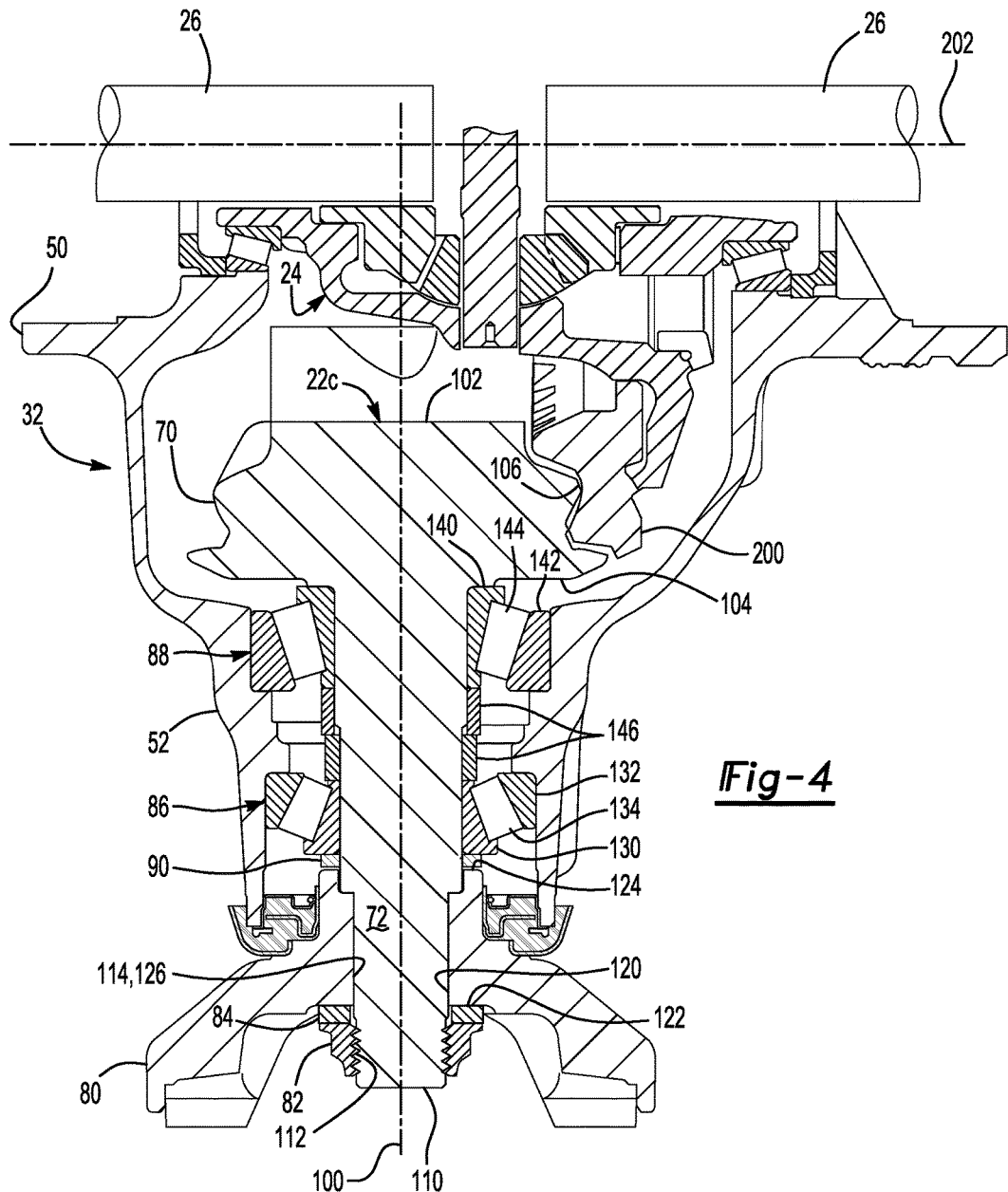

The gear portion 70 and the shaft portion 72 may extend along and may be centered about a first axis 100. The drive pinion may have a unitary or one-piece construction in which the gear portion 70 and the shaft portion 72 are integrally formed as a single component, such as is shown in FIGS. 2-4. Alternatively, the drive pinion may have a multi piece construction in which the gear portion 70 and the shaft portion 72 are provided as separate components, such as is shown in FIGS. 5-9.

The gear portion 70 may extend outwardly from the first axis 100 and may include a first gear portion end surface 102, a second gear portion end surface 104, and a set of teeth 106.

The first gear portion end surface 102 may be disposed at an end of the drive pinion 22. For example, the first gear portion end surface 102 may be disposed at a narrow or tapered end of the gear portion 70. The first gear portion end surface 102 may be disposed substantially perpendicular to the first axis 100 in one or more embodiments.

The second gear portion end surface 104 may be disposed opposite the first gear portion end surface 102. For example, the second gear portion end surface 104 may be disposed adjacent to the second roller bearing assembly 88 and may extend further from the first axis 100 than the first gear portion end surface 102. In addition, the second gear portion end surface 104 may be disposed proximate or may extend from the shaft portion 72. The second gear portion end surface 104 or a portion thereof may be disposed substantially perpendicular to the first axis 100 in one or more embodiments.

The set of teeth 106 may extend between the first gear portion end surface 102 and the second gear portion end surface 104. The set of teeth 106 may be arranged around the first axis 100 and may be provided in a repeating pattern. In at least one embodiment, the teeth 106 may be configured as hypoid gear teeth or bevel gear teeth, such as may be provided with a plain bevel gear or a spiral bevel gear. As such, the gear portion 70 may have a generally tapered or truncated conical shape that may become narrower (i.e., may be disposed closer to the first axis 100) in an inboard direction that extends along the first axis 100 toward the axle housing 30 and the differential assembly 24, or in an upward direction from the perspective shown in FIGS. 2-9.

In a multi piece configuration such as is shown in FIGS. 5-9, the gear portion 70 may also include a gear portion hole 108. The gear portion hole 108 may extend around the first axis 100 and may extend from the first gear portion end surface 102 to the second gear portion end surface 104. The gear portion hole 108 may receive the shaft portion 72. The gear portion hole 108 may be provided in various configurations. For instance, the gear portion hole 108 may be configured as a cylindrical bore that may have a substantially circular cross-section. Alternatively, a set of gear portion splines may be provided in the gear portion hole 108 and may extend toward the first axis 100 as will be discussed in more detail below. It is also contemplated that the gear portion and the shaft portion may be made of different materials in a multi piece configuration. For example, the gear portion may be made of gear grade steel while the shaft portion may be made of a lower cost or lesser grade of steel. In addition, a multi piece configuration may make it easier to replace or service the roller bearing assemblies as the gear portion may be removed from the shaft portion to improve access to and facilitate removal of the second roller bearing assembly 88. Also, a multi piece configuration may allow meshing of the teeth of the drive pinion and ring gear to be adjusted and set without disturbing the roller bearing assemblies that rotatably support the drive pinion. A multi piece design may also make it easier to adjust a large gear portion, which may be employed to provide faster gear ratios.

The shaft portion 72 may extend from the gear portion 70. More specifically, the shaft portion 72 may extend along the first axis 100 such that at least a part of the shaft portion 72 may extend axially away from the gear portion 70 and away from second gear portion end surface 104. In at least one embodiment, the shaft portion 72 may include a first shaft end surface 110, a first threaded portion 112, and a first set of shaft splines 114.

The first shaft end surface 110 may be disposed at an end of the shaft portion 72. As such, the first shaft end surface 110 may be disposed proximate the yoke retainer 82 and may be disposed at an opposite end of the drive pinion 22 from the gear portion 70. Moreover, the first shaft end surface 110 may be disposed outside of the housing 20 in one or more embodiments.

The first threaded portion 112 may be disposed proximate the first shaft end surface 110. The first threaded portion 112 may include one or more threads that may extend around the first axis 100. The threads of the first threaded portion 112 may facilitate mounting of the yoke retainer 82 as will be discussed in more detail below The first set of shaft splines 114 may be disposed between the threaded portion 112 and the first roller bearing assembly 86. The shaft splines 114 may be arranged around the first axis 100. For example, the shaft splines 114 may be disposed substantially parallel to the first axis 100 and may extend away from the first axis 100. The shaft splines 114 may mate with a corresponding spline arrangement that may be provided with the yoke 80 as will be discussed in more detail below.

The yoke 80 may connect the drive pinion 22 to another component to facilitate the transmission of torque. For example, the yoke 80 may be coupled to a universal joint, which in turn may be operatively connected to a rotating drivetrain component, such as a drive shaft or a prop shaft. The yoke 80 may be at least partially disposed outside the housing 20 and may be fixedly disposed on the drive pinion 22. For instance, the yoke 80 may include a yoke hole 120 that may extend around the first axis 100 and may extend from a first yoke end surface 122 to a second yoke end surface 124. The yoke hole 120 may receive the shaft portion 72. It is also contemplated that the yoke 80 may be integrally formed with the shaft portion 72, in which case the yoke 80 and drive pinion 22 may be a unitary one-piece component rather than separate components. In a one-piece configuration, a separate fastener such as a yoke retainer 82 may be omitted.

The first yoke end surface 122 may be disposed at an end of the yoke 80 that may face away from the gear portion 70. The first yoke end surface 122 may be disposed outside of the housing 20 in one or more embodiments.

The second yoke end surface 124 may be disposed opposite the first yoke end surface 122. As such, the second yoke end surface 124 may face toward the gear portion 70. The yoke 80 and the second yoke end surface 124 may be spaced apart from and may not engage the first roller bearing assembly 86 and the second roller bearing assembly 88 in one or more embodiments. The second yoke end surface 124 may or may not have a recess that receives the shaft portion 72.

A set of yoke splines 126 may facilitate mounting of the yoke 80 to the shaft portion 72. The yoke splines 126 may be disposed in the yoke hole 120 and may extend toward the first axis 100. The yoke splines 126 may be arranged in a repeating pattern around the first axis 100 and may extend substantially parallel to the first axis 100. For example, the yoke splines 126 may extend in an axial direction between the first yoke end surface 122 and the second yoke end surface 124. The yoke splines 126 may mate with the shaft splines 114 and may cooperate to inhibit rotation of the yoke 80 about the first axis 100 with respect to the shaft portion 72 and may transmit torque from the yoke 80 to the drive pinion 22.

The yoke retainer 82 may couple the yoke 80 to the drive pinion 22. For example, the yoke retainer 82 may be configured as a nut and may have a set of threads that may mate with the first threaded portion 112 of the shaft portion 72. The yoke retainer 82 may be rotated to tighten the yoke retainer 82 and secure the yoke 80 against the drive pinion 22; however, rotation of the yoke retainer 82 may not exert a preload force on the first roller bearing assembly 86 or the second roller bearing assembly 88 as will be discussed in more detail below. It is also contemplated that the yoke retainer 82 may be configured as a retainer ring or a snap ring, in which case the first threaded portion 112 may be omitted.

The washer 84 may be disposed between the yoke 80 and the yoke retainer 82. For example, the washer 84 may extend around the first axis 100 and may engage the first yoke end surface 122 and the yoke retainer 82.

The first roller bearing assembly 86 may be disposed in the housing 20. For example, the first roller bearing assembly 86 may be disposed in body portion 52 of the differential carrier 32. The first roller bearing assembly 86 may rotatably support the shaft portion 72 of the drive pinion 22. The first roller bearing assembly 86 may be axially positioned or disposed along the first axis 100 between the yoke 80 and the second roller bearing assembly 88. The first roller bearing assembly 86 may include a first inner race 130, a first outer race 132, and a first set of roller bearing elements 134.

The first inner race 130 may be disposed on and may engage the shaft portion 72. For example, the first inner race 130 may be configured as a ring that may extend around the shaft portion 72. The first inner race 130 may be spaced apart from and may not engage the yoke 80 in one or more embodiments.

The first outer race 132 may be configured as a ring that may extend around and may be spaced apart from the first inner race 130. The first outer race 132 may be disposed on the housing 20. For example, the first outer race 132 may be received inside and may engage the body portion 52 of the differential carrier 32.

The first set of roller bearing elements 134 may be disposed between the first inner race 130 and the first outer race 132. The roller bearing elements 134 may facilitate rotation of the first inner race 130 with respect to the first outer race 132. The roller bearing elements 134 may have any suitable configuration that may be compatible with the first inner race 130 and the first outer race 132. For instance, the roller bearing elements 134 may be configured as roller bearings or tapered roller bearings in one or more embodiments.

The second roller bearing assembly 88 may be disposed in the housing 20. For example, the second roller bearing assembly 88 may be disposed in body portion 52 of the differential carrier 32. The second roller bearing assembly 88 may also rotatably support the shaft portion 72 of the drive pinion 22. The second roller bearing assembly 88 may be axially positioned or disposed along the first axis 100 between the first roller bearing assembly 86 and the gear portion 70 of the drive pinion 22. In addition, the second roller bearing assembly 88 may be spaced apart from and may not engage the first roller bearing assembly 86. The second roller bearing assembly 88 may include a second inner race 140, a second outer race 142, and a second set of roller bearing elements 144.

The second inner race 140 may be disposed on and may engage the shaft portion 72. For example, the second inner race 140 may be configured as a ring that may extend around the shaft portion 72. The second inner race 140 may be disposed proximate and may engage the second gear portion end surface 104. In addition, one or more spacers 146 may be disposed between the first inner race 130 and the second inner race 140. The spacers 146 may have an annular or ring shaped configuration and may facilitate the transmission of a bearing preload force as will be discussed in more detail below.

The second outer race 142 may be configured as a ring that may extend around and may be spaced apart from the second inner race 140. The second outer race 142 may be disposed on the housing 20. For example, the second outer race 142 may be received inside and may engage the body portion 52 of the differential carrier 32.

The second set of roller bearing elements 144 may be disposed between the second inner race 140 and the second outer race 142. The roller bearing elements 144 may facilitate rotation of the second inner race 140 with respect to the second outer race 142. The roller bearing elements 144 may have any suitable configuration as previously described with respect to the roller bearing elements 134.

The preload element 90 may exert a preload force on the first roller bearing assembly 86 and/or the second roller bearing assembly 88. More specifically, the preload element 90 may exert a preload force on the first set of roller bearing elements 134, the second set of roller bearing elements 144, or both. A preload force or bearing preload may be an axial or thrust load that is applied to a bearing assembly or bearing element that removes excess play. The preload element 90 may be disposed on the drive pinion 22 and an inboard direction from the yoke 80 and the yoke retainer 82. The inboard direction may be an axial direction that extends away from the yoke 80 and the yoke retainer 82. For example, the inboard direction may extend axially or along the first axis 100 in a direction that extends from the yoke retainer 82 toward the gear portion 70, or upward in the perspective shown in FIGS. 2-9. The preload element 90 may be disposed in various locations and may have various configurations as will be discussed with reference to FIGS. 2-10.

Details regarding the configuration shown in FIGS. 2-10 will now be described in further detail. For clarity in reference, a letter is added to the reference designations for the drive pinions in FIGS. 3-9. For instance, the drive pinion is designated 22b in FIG. 3, 22c in FIG. 4 etc.

Referring to FIG. 2, the drive pinion 22 as a unitary one-piece configuration in which the gear portion 70 may be integrally formed with the shaft portion 72. The shaft portion 72 may include a yoke stop shoulder 150 and a second threaded portion 152.

The yoke stop shoulder 150 may be disposed in the yoke hole 120 and may be axially positioned between the first shaft end surface 110 and the preload element 90. The yoke stop shoulder 150 may have a larger diameter than and adjacent part of the shaft portion 72 that extends through the yoke 80. The yoke stop shoulder 150 may engage the yoke 80 and act as a stop that may prevent axial movement of the yoke 80 in the inboard direction.

The second threaded portion 152 may be axially located between the yoke stop shoulder 150 and the first roller bearing assembly 86. The second threaded portion 152 may include one or more threads that may extend around the first axis 100.

The preload element 90 may be a pinion nut through which the shaft portion 72 may extend. The pinion nut may be axially disposed between the yoke 80 and the first roller bearing assembly 86. For example, the pinion nut may be axially disposed between the second yoke end surface 124 and the first inner race 130 and the first set of roller bearing elements 134. The pinion nut may have threads that may mate with the second threaded portion 152.

Rotation of the preload element 90 in a direction that tightens the preload nut may exert or increase the preload force that is exerted on the first inner race 130. For example, tightening the preload not may actuate the first inner race 130 in the inboard direction and increase the force exerted on the first set of roller bearing elements 134. In addition, a preload force may be transmitted to the second inner race 140 by one or more spacers 146. It is also contemplated that a retention feature, such as a pin, set screw, or thread locking compound, may be provided to further secure and inhibit loosening of the preload element once the desired bearing preload has been attained.

The yoke 80 may be mounted to the shaft portion 72 after the desired preload force is applied with the preload element 90. The yoke 80 may be secured with the yoke retainer as previously described. The yoke 80 and the yoke retainer 82 may not exert a preload force on the first roller bearing assembly 86 or the second roller bearing assembly 88. Torque that is applied to the yoke retainer 82 may not affect the preload force that is exerted by the preload element 90 since the yoke 80 does not actuate the first inner race 130 in an inboard direction due to prior tightening of the preload element 90. The yoke 80 may be spaced apart from and may not engage the preload element 90 due to the yoke stop shoulder 150 in one or more embodiments.

Referring to FIG. 3, the drive pinion 22b has a unitary one-piece configuration in which the gear portion 70 is integrally formed with the shaft portion 72. In this configuration, the yoke stop shoulder 150 and second threaded portion 152 may be omitted. In addition, the first inner race 130 of the first roller bearing assembly 86 may be the preload element 90. Force that is applied to preload element 90 in the inboard direction may provide a preload force and increase the force exerted on the first set of roller bearing elements 134. Once the desired preload force is attained, the first inner race 130 may be welded to the shaft portion 72 to prevent movement of the first inner race 130 and to maintain the desired preload force.

The yoke 80 may be subsequently mounted to the shaft portion 72 and secured with the yoke retainer 82 as previously described. Torque that is applied to the yoke retainer 82 may not affect the preload force that is exerted by the preload element 90 due to the yoke stop shoulder 150.

Referring to FIG. 4, the drive pinion 22c has a unitary one-piece configuration in which the gear portion 70 is integrally formed with the shaft portion 72. For example, the drive pinion 22c in FIG. 4 may have the same configuration or a similar configuration as the drive pinion 22b in FIG. 3.

The preload element 90 is a ring that extends around the first axis 100 and receives the shaft portion 72. The preload element 90 may be axially positioned between the yoke 80 and the first roller bearing assembly 86. More specifically, the preload element 90 may be axially positioned between the second yoke end surface 124 and the first inner race 130. Force that is applied to preload element 90 in the inboard direction may exert a preload force on the first inner race 130 and the first set of roller bearing elements 134. Once the desired preload force is attained, the preload element 90 may be welded to the shaft portion 72 to prevent movement of the preload element 90 and to maintain the desired preload force.

The yoke 80 may be subsequently mounted to the shaft portion 72 and secured with the yoke retainer 82 as previously described. Torque that is applied to the yoke retainer 82 may not affect the preload force that is exerted by the preload element 90 due to the welded preload element 90 and the yoke stop shoulder 150.

Figure 5:
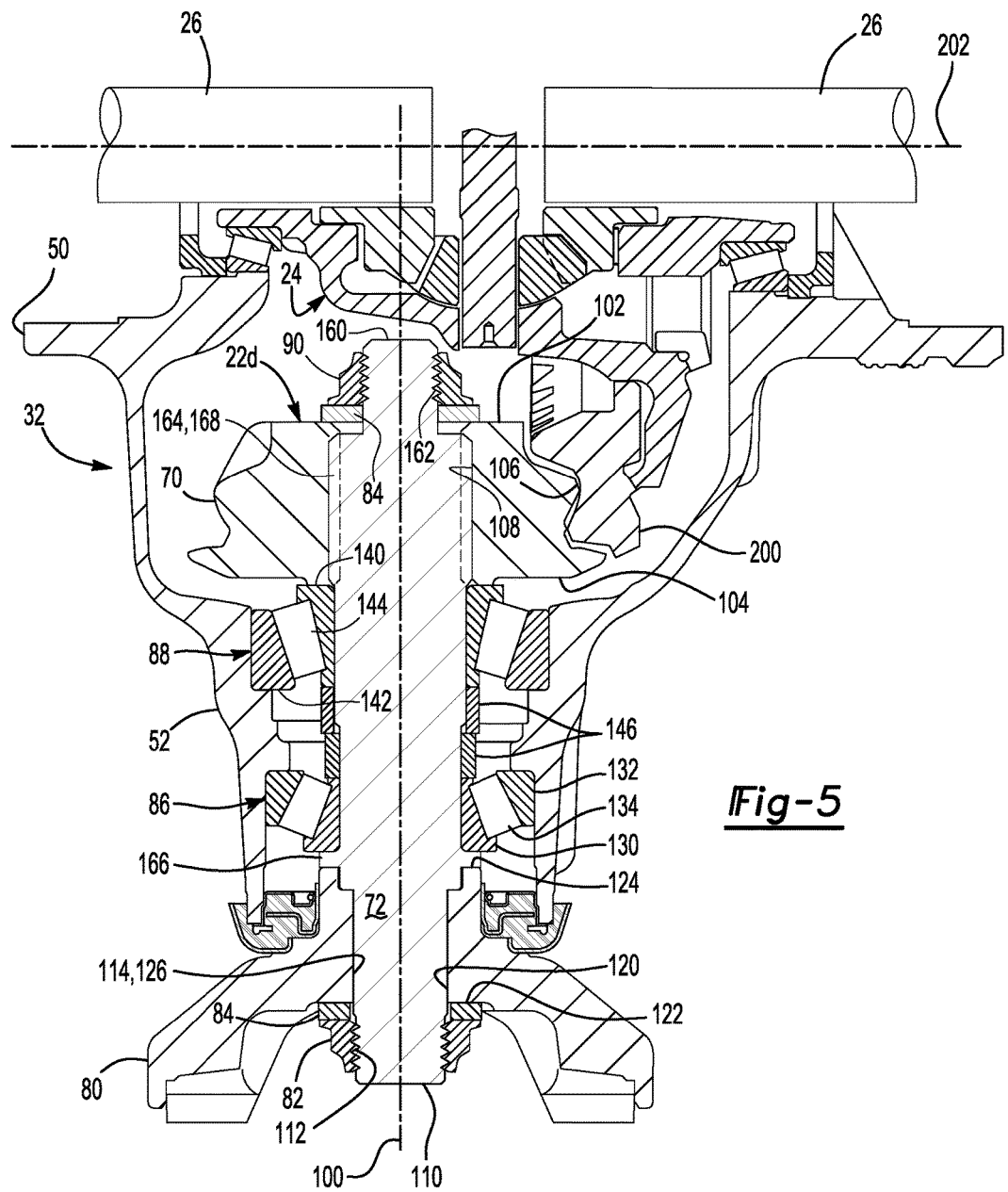
FIGS. 5-9 are section views of a portion of the axle assembly having a drive pinion with a multi-piece configuration.

Referring to FIG. 5, the drive pinion 22d has a two-piece configuration in which the gear portion 70 is a separate component from the shaft portion 72. As such, the shaft portion 72 may extend through the gear portion 70. In addition, the shaft portion 72 may have a second shaft end surface 160, a second threaded portion 162, a second set of shaft splines 164, and an annular shoulder 166.

The second shaft end surface 160 may be disposed opposite the first shaft end surface 110. The second shaft end surface 160 may be disposed outside of the gear portion hole 108.

The second threaded portion 162 may be disposed proximate the second shaft end surface 160. The second threaded portion 162 may include one or more threads that may extend around the first axis 100. The threads of the second threaded portion 162 may facilitate mounting of a preload element 90 that is configured as a pinion nut.

The second set of shaft splines 164 may be axially disposed between the second threaded portion 162 and the second roller bearing assembly 88. The second shaft splines 164 may be arranged around the first axis 100. For example, the second shaft splines 164 may be disposed substantially parallel to the first axis 100 and may extend away from the first axis 100. It is also contemplated that the second shaft splines 164 and the gear portion splines 168 may be provided with a helical configuration to inhibit chucking. The second set of shaft splines 164 may mate with corresponding gear portion splines 168 that may be provided in the gear portion hole 108. The second shaft splines 164 may cooperate with the gear portion splines 168 to inhibit rotation of the gear portion 70 with respect to the shaft portion 72. The second shaft splines 164 may permit axial movement of the shaft portion 72 relative to or with respect to the gear portion 70 in response to a biasing force exerted by the preload element 90.

The annular shoulder 166 may be configured as an annular protrusion that may extend around the first axis 100. The annular shoulder 166 may be axially positioned between the yoke 80 and the first inner race 130. The annular shoulder 166 may be integrally formed with the shaft portion 72 and may engage the first inner race 130.

The preload element 90 may be a pinion nut through which the shaft portion 72 may extend. The pinion nut may couple the gear portion 70 to the shaft portion 72 and may be axially positioned between the gear portion 70 and the second shaft end surface 160. The pinion nut may have threads that may mate with the second threaded portion 162 of the shaft portion 72. Rotation of the preload element 90 in a direction that tightens the pinion nut may actuate or bias the shaft portion 72 in the inboard direction with respect to the gear portion 70. Actuating or biasing the shaft portion 72 in the inboard direction may cause the annular shoulder 166 to exert a preload force on the first inner race 130 and the first set of roller bearing elements 134. Another washer 84 may be provided between the pinion nut and the drive pinion 22*d*.

The yoke 80 may be mounted to the shaft portion 72 and secured with the yoke retainer 82 as previously described. Torque that is applied to the yoke retainer 82 may not affect the preload force that is exerted by the preload element 90 since the yoke 80 may not actuate the first inner race 130 an inboard direction due to the presence of the annular shoulder 166.

Figure 6:
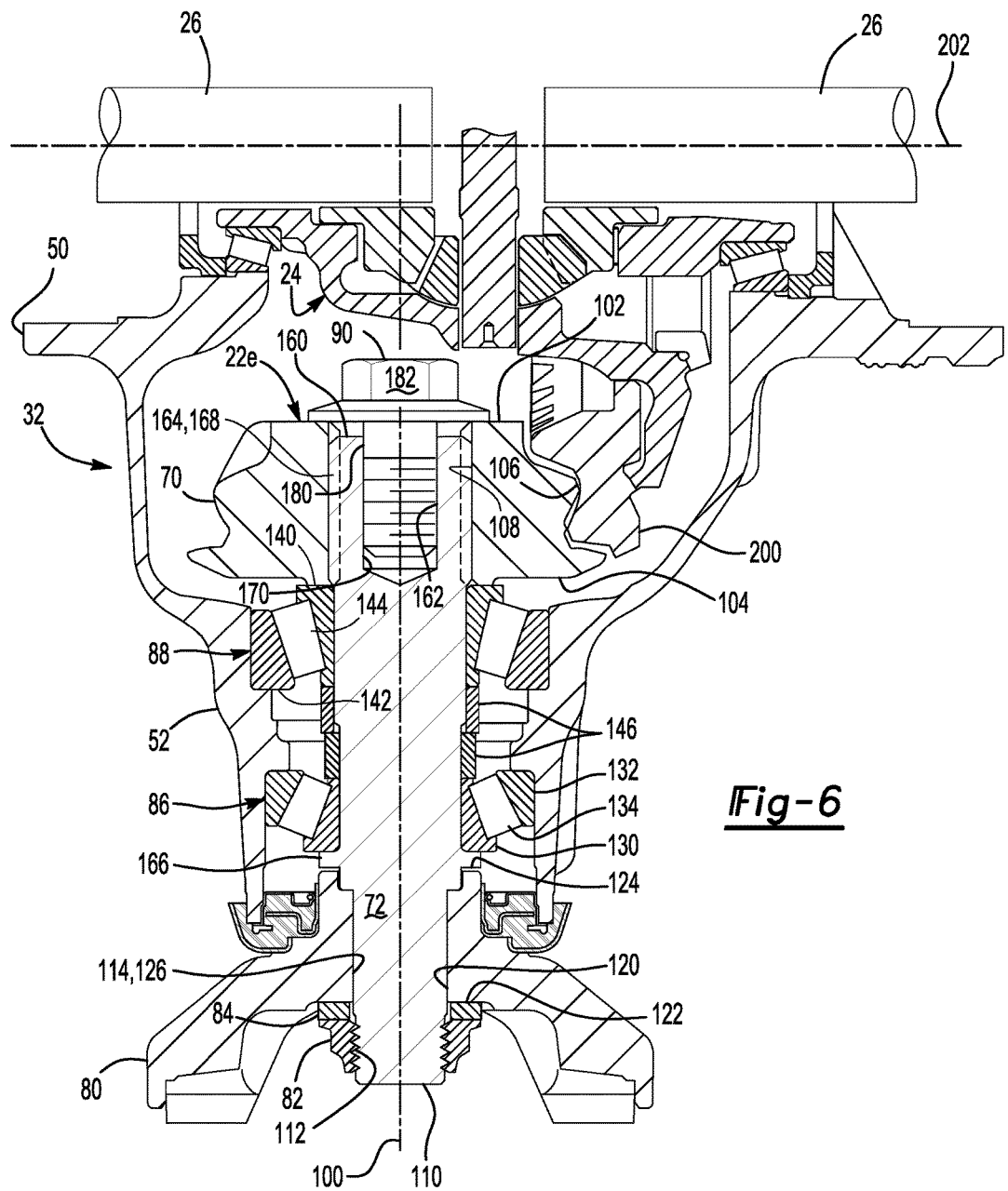

Referring to FIG. 6, the drive pinion 22*e* has a two-piece configuration in which the gear portion 70 is a separate component from the shaft portion 72. The shaft portion 72 may have an annular shoulder 166 as shown in FIG. 5. The shaft may also have a second shaft end surface 160, a second threaded portion 162, and a second set of shaft splines 164; however, the second threaded portion 162 may be disposed inside the drive pinion 22*e*. More specifically, the shaft portion 72 may have a shaft bore 170 that may extend from the second shaft end surface 160. The shaft bore 170 may be a blind hole. The second threaded portion 162 may be provided in the shaft bore 170 and may have threads that may extend around and may extend toward the first axis 100.

The preload element 90 may be a threaded fastener, such as a bolt or a screw. The threaded fastener may have a threaded shank 180 and an enlarged head 182.

The threaded shank 180 may be received in the shaft bore 170. The threaded shank 180 may have one or more threads that may mate with the second threaded portion 162.

The enlarged head 182 may extend outwardly or away from the first axis 100 with respect to the threaded shank 180 and the shaft portion 72. For example, the enlarged head 182 may extend past the outside circumference of the shaft portion 72 and may engage the first gear portion end surface 102.

Rotation of the preload element 90 in a direction that tightens the threaded fastener may actuate or bias the shaft portion 72 in the inboard direction with respect to the gear portion 70. Actuating or biasing the shaft portion 72 in the inboard direction may cause the annular shoulder 166 to exert a preload force on the first inner race 130 and the first set of roller bearing elements 134. It is also contemplated that a retention feature may be provided to further secure and inhibit loosening of the preload element once the desired bearing preload has been attained. It is also noted that the configuration shown in FIG. 6 may have a reduced axial length in the configuration shown in FIG. 5, thereby reducing package space.

The yoke 80 may be mounted to the shaft portion 72 and secured with the yoke retainer 82 as previously described. Torque that is applied to the yoke retainer 82 may not affect the preload force that is exerted by the preload element 90 since the yoke 80 may not actuate the first inner race 130 an inboard direction due to the presence of the annular shoulder 166.

Figure 7:
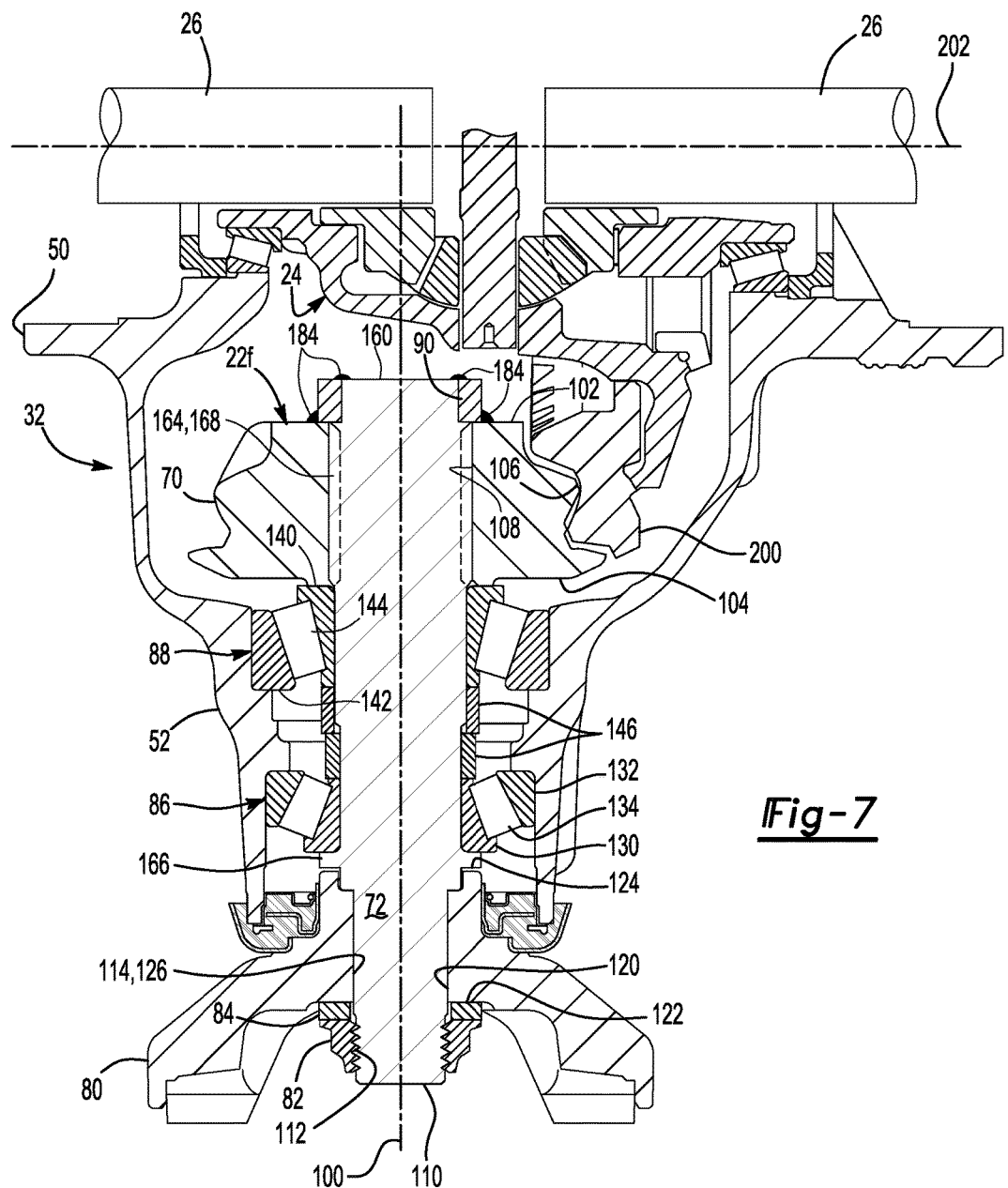

Referring to FIG. 7, the drive pinion 22*f* has a two-piece configuration in which the gear portion 70 is a separate component from the shaft portion 72. The shaft portion 72 may have a similar configuration to the configuration shown in FIG. 5 in that the shaft portion may include an annular shoulder 166 and may extend through the gear portion 70 such that the shaft portion 72 may protrude axially from the first gear portion end surface 102. The second threaded portion 162 may be omitted.

The preload element 90 may be a ring that may extend around and may receive the region of the shaft portion 72 that protrudes in an inboard direction from the gear portion 70. As such, the ring may be axially positioned between the second shaft end surface 160 and the second gear portion end surface 104. Moreover, the gear portion 70 may be axially positioned between the ring and the second roller bearing assembly 88. For example, the ring may engage the first gear portion end surface 102 and the second gear portion end surface 104 may engage the second inner race 140.

Force that is applied to the shaft portion 72 in the inboard direction may exert a preload force on the first inner race 130 and the first set of roller bearing elements 134. Force that is applied or exerted the inboard direction on the shaft portion 72 may actuate or bias the shaft portion 72 in the inboard direction with respect to the gear portion 70. Actuating or biasing the shaft portion 72 in the inboard direction may cause the annular shoulder 166 to exert a preload force on the first inner race 130 and the first set of roller bearing elements 134. Once the desired preload force is attained, the preload element 90 may be welded to the shaft portion 72 or the gear portion 70 as represented by welds 184 and the shaft portion 72 to prevent movement of the preload element 90 and to maintain the desired preload force. For example, a weld may be applied that may extend from the second shaft end surface one to the preload element 90, from the first gear portion end surface 102 to the preload element 90, or both.

The yoke 80 may be mounted to the shaft portion 72 and secured with the yoke retainer 82 as previously described. Torque that is applied to the yoke retainer 82 may not affect the preload force that is exerted by the preload element 90 since the yoke 80 may not actuate the first inner race 130 an inboard direction due to the presence of the annular shoulder 166.

Figure 8:
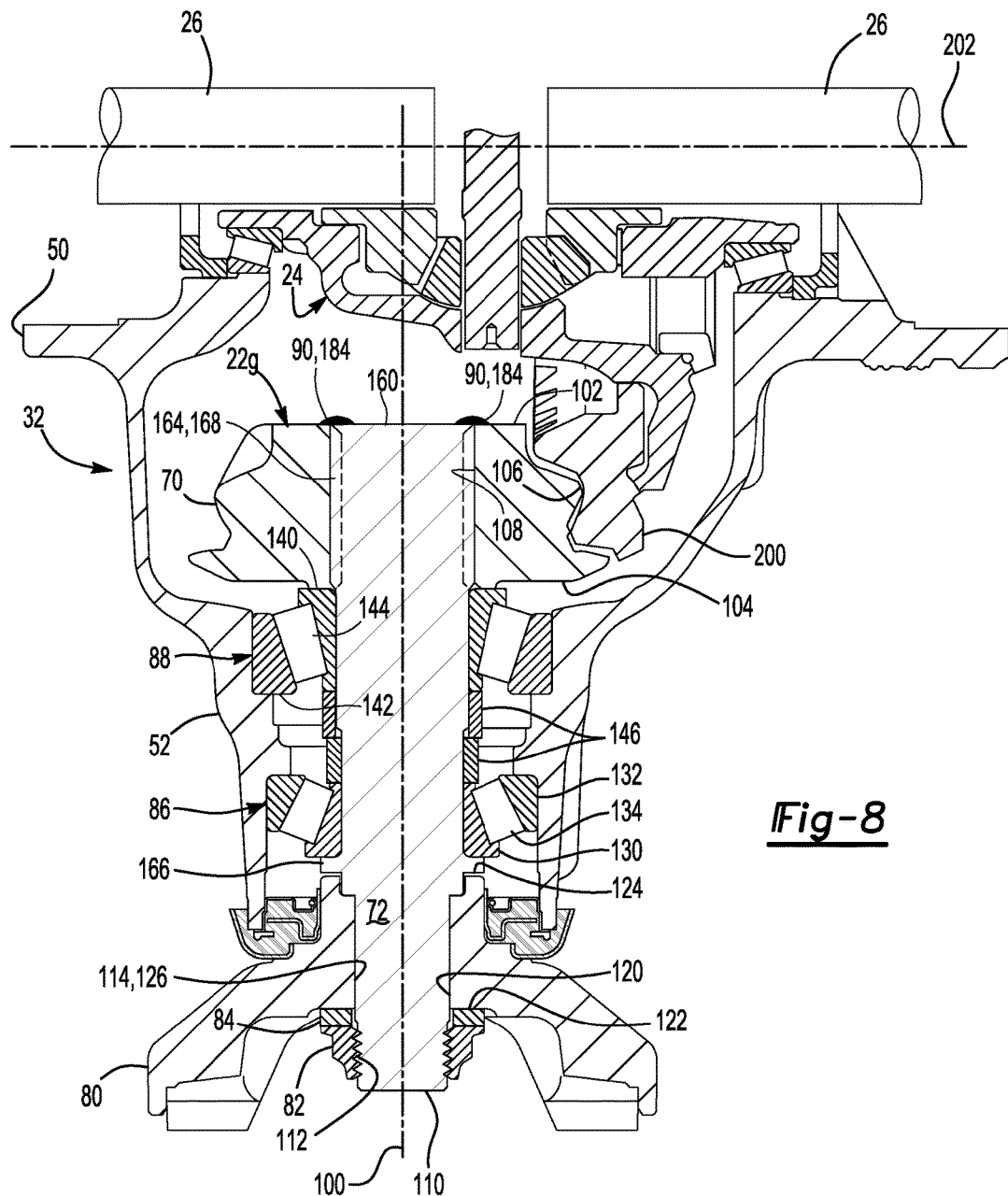

Referring to FIG. 8, the drive pinion 22*g* has a two-piece configuration that is similar to the configuration shown in FIG. 7, but the shaft portion 72 may or may protrude from the gear portion 70 in the inboard direction. In addition, the preload element 90 may be a weld 184 rather than a ring. The weld may be disposed at the end of the shaft portion 72, between the shaft portion 72 and the gear portion 70, or both. Also, it is contemplated that the splined connection between the gear portion 70 and the shaft portion 72 may be omitted.

Force that is applied to the shaft portion 72 in the inboard direction may exert a preload force on the first inner race 130 and the first set of roller bearing elements 134 via the annular shoulder 166 as previously described. Once the desired preload force is attained, the preload element 90 may be provided as a weld that welds the shaft portion 72 to the gear portion 70 to prevent relative movement of the gear portion 70 and the shaft portion 72 and to maintain the desired preload force. For example, a weld may be applied that may extend from the second shaft end surface 160 to the first gear portion end surface 102.

The yoke 80 may be mounted to the shaft portion 72 and secured with the yoke retainer 82 as previously described. Torque that is applied to the yoke retainer 82 may not affect the preload force that is exerted by the preload element 90 since the yoke 80 may not actuate the first inner race 130 an inboard direction due to the presence of the annular shoulder 166.

Figure 9:
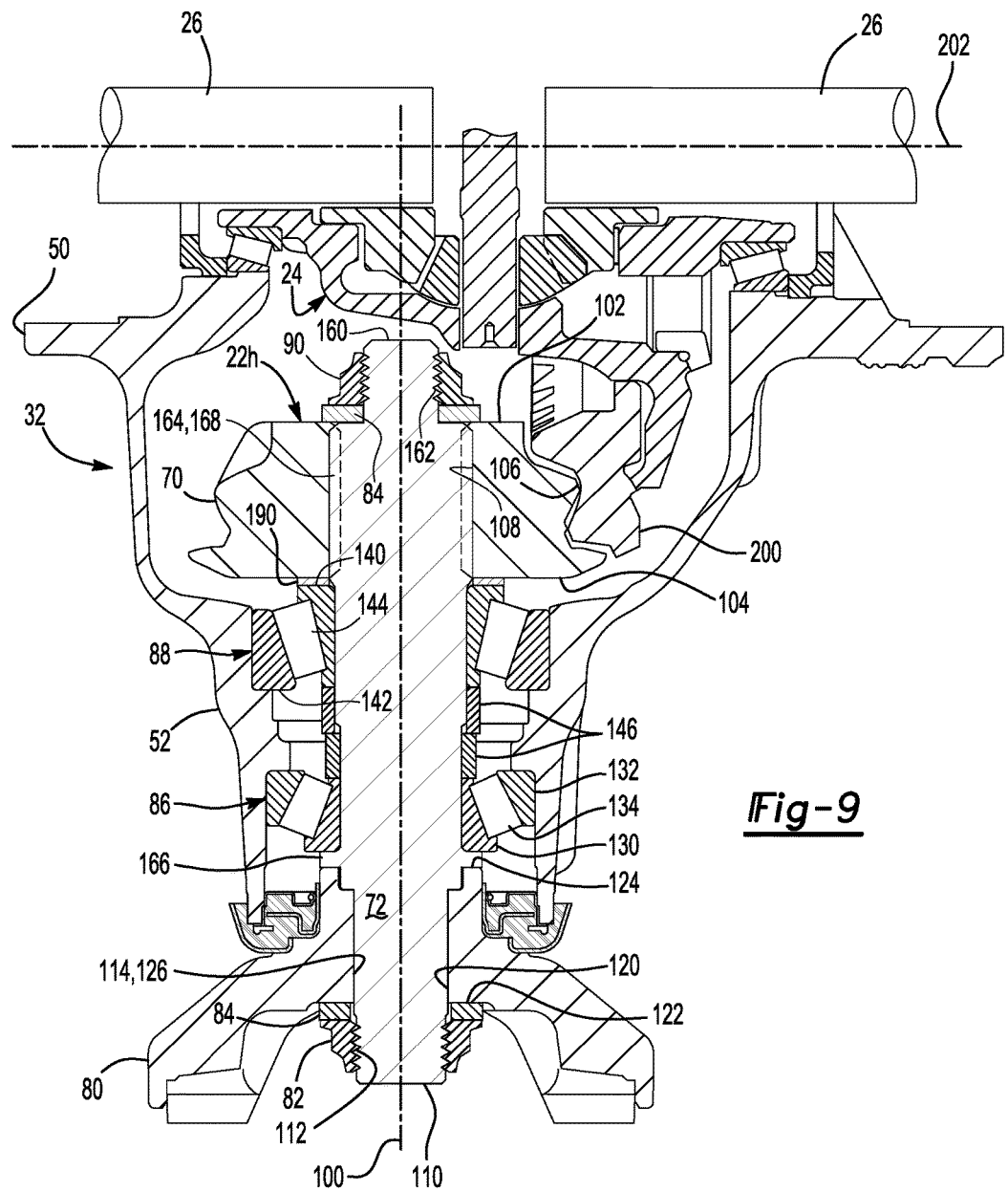

Referring to FIG. 9, the drive pinion 22h has a two-piece configuration that is nearly identical to the configuration shown in FIG. 5. In FIG. 9, one or more shims 190 may be provided between the gear portion 70 and the second roller bearing assembly 88. More specifically, one or more shims 190 may be provided that may extend from the second gear portion end surface 104 to the second inner race 140. The shims 190 may be configured as rings that may extend around and may receive the shaft portion 72. The shims 190 may alter the contact pattern between the teeth 106 of the gear portion 70 and the teeth of a ring gear 200 that may be provided with the differential assembly 24. It is also contemplated that one or more shims may be provided with any of the two-piece drive pinion configurations previously discussed.

Quality and efficiency improvements may be realized by separating retention of the yoke from application of the bearing preload force. For example, a dummy yoke may be used during assembly of a differential carrier to simulate a production yoke. The dummy yoke may be secured with a yoke retainer, but may be removed and replaced with a production yoke during subsequent assembly steps or by a vehicle manufacturer. The yoke retainer and dummy yoke are removed from the drive pinion to permit the production yoke to be installed. As such, adjustments to the bearing preload that were made with the dummy yoke (such as by tightening the yoke retainer that secures the dummy yoke) are lost when the yoke retainer and dummy yoke are removed and the production yoke is installed, thereby resulting in bearing preload variation and the possibility that the bearing preload may no longer be within a desired bearing preload tolerance. Thus the drive pinion configurations described above allow the bearing preload force to be retained when a production yoke is installed or the yoke is replaced. Maintaining the desired bearing preload force may improve performance, operating efficiency, and/or durability of the axle assembly.

Separating retention of the yoke from application of the bearing preload force may also allow a collapsible spacer to be used to set or adjust the bearing preload. A collapsible spacer may reduce the process steps associated with setting the bearing preload as compared to selecting and installing spacers between the bearing assemblies. Moreover, the use of a collapsible spacer may allow bearing torque to be compared to axial load and may reduce the bearing preload setting range which may help improve operating efficiency.

Referring to FIG. 2, the differential assembly 24 may be received in the center portion 40 when the differential carrier 32 is assembled to the housing 20. The differential assembly 24 may transmit torque to the vehicle traction wheel assemblies and permit the traction wheel assemblies to rotate at different velocities. An abbreviated discussion of the operation of the axle assembly 10 and the differential assembly 24 is as follows.

The yoke 80 may provide torque to the drive pinion. The drive pinion may rotate about the first axis 100 and provide torque to the ring gear 200. The ring gear 200 may be fixedly mounted on a case of the differential assembly 24. The ring gear 200 may rotate about a second axis 202 and may be operatively connected to the axle shafts 26 by a differential unit that may be received in the differential case. As such, the differential assembly 24 may receive torque via the ring gear 200 and provide torque to the axle shafts 26.

Referring to FIGS. 1 and 2, the axle shafts 26 may transmit torque from the differential assembly 24 to corresponding traction wheel assemblies. In FIG. 2, portions of two axle shafts 26 are shown. Each axle shaft 26 may extend through a different arm portion 42 of axle housing 30. The axle shafts 26 may extend along and may be rotated about the second axis 202 by the differential assembly 24. Each axle shaft 26 may have a first end and a second end. The first end may be coupled to the differential assembly 24. The second end may be disposed opposite the first end and may be operatively connected to a wheel end assembly that may have a wheel hub that may support a wheel. As shown in FIG. 1, an axle flange 210 may be disposed proximate the second end of the axle shaft 26 and may facilitate coupling of the axle shaft 26 to the wheel hub.

Figure 10:
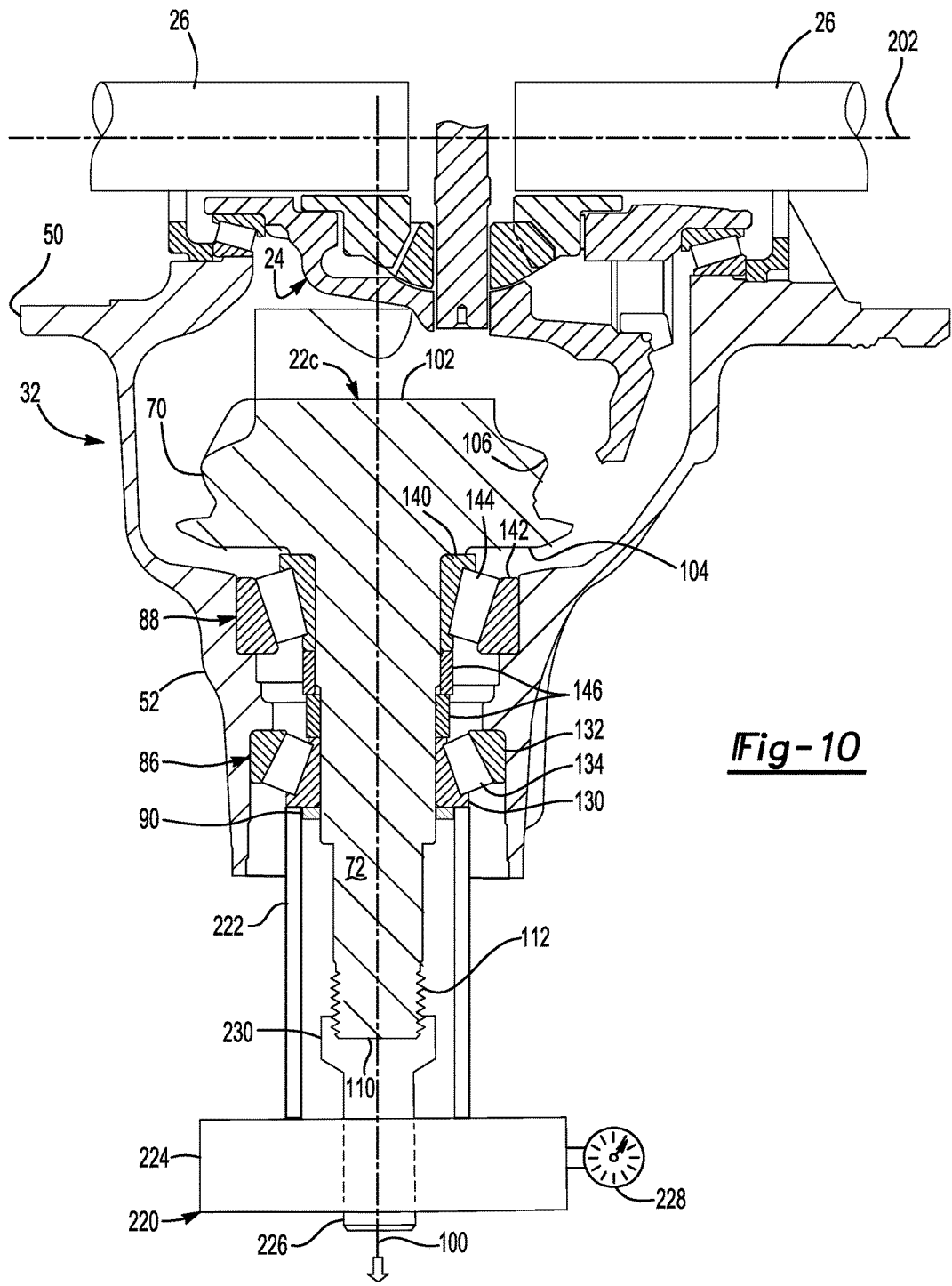
FIGS. 10 and 11 illustrate examples of bearing preload measurement and setting devices.
Figure 11:
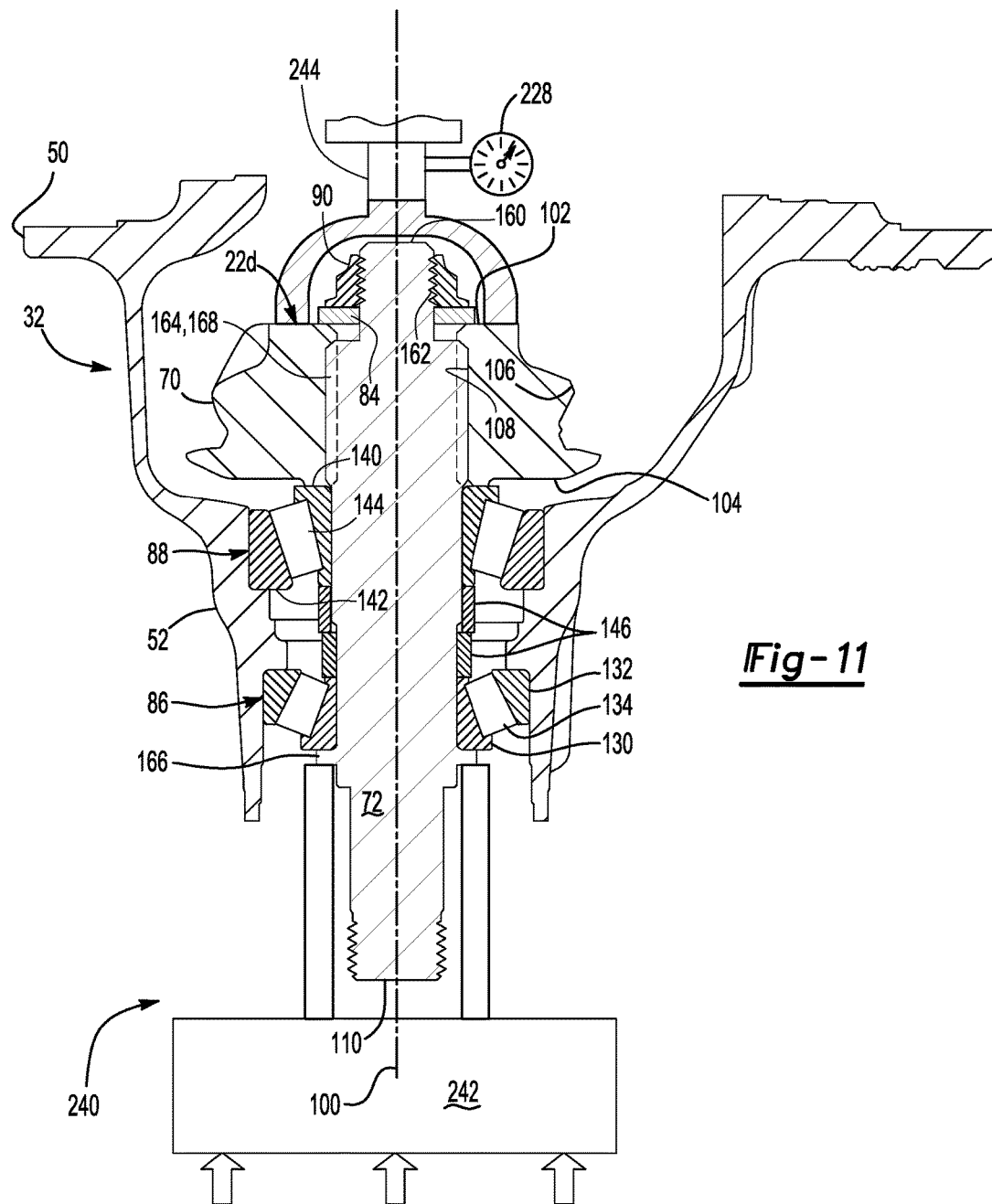

Referring to FIGS. 10 and 11, examples of a bearing preload apparatus are shown. A bearing preload apparatus may be used to apply and measure the preload force that is exerted on at least one roller bearing assembly. It is also contemplated that a bearing preload apparatus may be used with drive pinion configurations other than those described above. For instance, the bearing preload apparatus may be used to assess the preload force associated with configurations in which the yoke retainer and yoke applied the bearing preload force.

In FIG. 10, a bearing preload apparatus 220 is shown in conjunction with the drive pinion of FIG. 4. The bearing preload apparatus 220 may include a mount 222, a load cylinder 224, an actuator shaft 226, and a preload measurement device 228.

The mount 222 may be disposed on and may mate with the yoke 80. The mount 222 may have a hole through which the actuator shaft 226 may extend. The mount 222 may be spaced apart from the actuator shaft 226 to facilitate movement of the actuator shaft 226 with respect to the mount 222.

The load cylinder 224 may be disposed on the mount 222. The load cylinder 224 may receive the actuator shaft 226. The load cylinder 224 may be configured to exert a load force on the actuator shaft 226 that may move the actuator shaft 226 along the first axis 100. The load cylinder 224 may have any suitable configuration. For example, the load cylinder 224 may be a pneumatic, hydraulic, or electromechanical actuator in one or more embodiments.

The actuator shaft 226 may extend through the mount 222 and the load cylinder 224. The actuator shaft 226 may extend along the first axis 100 and may have a first end and a second end. The first end may be attached to the shaft portion 72 of the drive pinion 22. For example, the first end may have a threaded socket 230 that may receive the shaft portion 72 and may be have threads that may mate with the first threaded portion 112. As such, the actuator shaft 226 and the shaft portion 72 may move together along the first axis 100 when the actuator shaft 226 is coupled to the shaft portion 72. The second end of the actuator shaft 226 may be disposed opposite the first end. The second end may protrude from the load cylinder 224.

The preload measurement device 228 may detect the load force that is exerted by the actuator shaft 226. The preload measurement device 228 may have any suitable configuration. For example, the preload measurement device 228 may be a load cell, strain gauge, or the like. The preload measurement device 228 may be disposed on the load cylinder 224 and may detect or measure the load force applied by the actuator shaft 226 to the drive pinion 22. For instance, a load force that is applied in an outboard direction (that may be opposite the inboard direction or away from the first and second roller bearing assemblies 86, 88) may be detected and measured by the preload measurement device 228. Once the desired preload force is applied, the preload element 90 may be tightened or secured to maintain the desired preload force. The load force may then be released and the bearing preload apparatus 220 may be removed.

Referring to FIG. 11, a configuration of a bearing preload device 240 that may be employed with a two-piece drive pinion configuration is shown. In this configuration, the bearing preload device 240 may include an actuator 242 and a preload measurement device 244.

The actuator 242 may apply a load force in the inboard direction. For example, the actuator 242 may apply a load force directly to the shaft portion 72 or indirectly to the shaft portion 72, such as via the yoke 80.

The preload measurement device 244 may detect the load force that is exerted by the actuator 242. The preload measurement device 244 may have any suitable configuration. For example, the preload measurement device 244 may be a load cell, strain gauge, or the like. The preload measurement device 244 may be positioned at an end of the drive pinion that may be disposed opposite the yoke 80 and may detect or measure the load force applied in an inboard direction by the actuator 242. The preload measurement device 244 may have a display or may communicate to a remotely located display to display the detected load force. Once the desired preload force is applied, the preload element 90 may be tightened or secured to maintain the desired preload force. The load force may then be released and the bearing preload device 240 may be removed.

A bearing preload apparatus may allow the preload force to be directly measured as opposed to being indirectly measured. For example, preload force may be indirectly measured by rotating the drive pinion and measuring the rolling force or resistance to rotation. Rolling force or rolling resistance may be indicative of the preload force on one or more bearings but may not provide a direct measurement of the load force. In addition, indirect measurement of the bearing preload force may result in an assessment of the actual bearing preload force that is applied after assembly rather than during the assembly process. As such, more accurate and reliable bearing preload may be applied using the preload measurement devices as described above. Moreover, a bearing preload apparatus may allow a bearing preload to be set more reliably and with reduced variation, thereby reducing rework or making adjustments to the bearing preload force. It is also contemplated that drive pinion may be rotated in the rotating torque may be assessed in conjunction with or independently of the use of a bearing preload apparatus. For instance, the torque exerted to rotate the drive pinion after the bearing preload force is applied may be measured and compared with design tolerances and adjusted as appropriate prior to securing the preload element.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a housing;
   a drive pinion that is rotatable about an axis with respect to the housing, the drive pinion including:
     a gear portion; and
     a shaft portion that extends from the gear portion and extends through the gear portion;
   a first set of roller bearing elements disposed in the housing that rotatably support the shaft portion, wherein the first set of roller bearing elements are part of a first roller bearing assembly that includes a first outer race that is disposed on the housing and a first inner race that is disposed on the shaft portion;
   a second set of roller bearing elements disposed in the housing between the first set of roller bearing elements and the gear portion that rotatably support the shaft portion;
   a yoke that is at least partially disposed outside the housing, wherein the yoke receives the shaft portion;
   a yoke retainer that couples the yoke to the shaft portion; and
   a preload element that exerts a preload force on at least one of the first set of roller bearing elements and the second set of roller bearing elements, wherein the preload element is disposed on the drive pinion in an inboard direction from the yoke, the inboard direction extending along the axis from the yoke toward the gear portion, wherein the shaft portion has a first shaft end surface disposed proximate the yoke retainer, a second shaft end surface disposed opposite the first shaft end surface, and an annular shoulder that extends away from the axis and is axially positioned between the yoke and the first inner race and the annular shoulder transmits the preload force to the first set of roller bearing elements.

2. The axle assembly of claim 1 wherein the preload element is disposed on the drive pinion in the inboard direction from the annular shoulder.

3. The axle assembly of claim 1 wherein the second set of roller bearing elements are part of a second roller bearing assembly that includes a second outer race that is disposed on the housing and a second inner race that is disposed on the shaft portion, and wherein the yoke and the yoke retainer do not exert the preload force on the first roller bearing assembly and the second roller bearing assembly.

4. The axle assembly of claim 3 wherein the yoke is spaced apart from and does not engage the first roller bearing assembly and the second roller bearing assembly.

5. The axle assembly of claim 1 wherein the preload element is a pinion nut through which the shaft portion extends.

6. The axle assembly of claim 1 wherein the preload element includes a weld that is welded to the drive pinion.

7. The axle assembly of claim 6 wherein the preload element is a ring that extends around and receives the shaft portion, wherein the preload element is welded to the shaft portion and the gear portion.

8. The axle assembly of claim 1 wherein the preload force is provided by axial movement of the shaft portion relative to the gear portion.

9. The axle assembly of claim 1 wherein the preload element is a weld that welds the gear portion to the shaft portion.

10. The axle assembly of claim 1 wherein the yoke is spaced apart from and does not engage the annular shoulder.

11. The axle assembly of claim 1 wherein the shaft portion and the gear portion have mating splines that permit axial positioning of the shaft portion relative to the gear portion and inhibit rotation of the gear portion with respect to the shaft portion.

12. The axle assembly of claim 1 wherein the preload element is a pinion nut that couples the gear portion to the shaft portion and is axially positioned between the gear portion and the second shaft end surface of the shaft portion.

13. The axle assembly of claim 1 wherein the preload element is a threaded fastener that has a threaded shank that is received in the shaft portion and an enlarged head that extends outwardly from the threaded shank and overlaps the gear portion, wherein tightening the threaded fastener exerts the preload force and actuates the shaft portion in the inboard direction.

14. The axle assembly of claim 1 wherein the preload element is a ring that extends around and receives the shaft portion, wherein the preload element is welded to the shaft portion or the shaft portion and the gear portion.

15. An axle assembly comprising:
a housing;
a drive pinion that is rotatable about an axis with respect to the housing, the drive pinion including:
a gear portion; and
a shaft portion that extends from the gear portion and extends through the gear portion;
a first set of roller bearing elements disposed in the housing that rotatably support the shaft portion;
a second set of roller bearing elements disposed in the housing between the first set of roller bearing elements and the gear portion that rotatably support the shaft portion;
a yoke that is at least partially disposed outside the housing, wherein the yoke receives the shaft portion;
a yoke retainer that couples the yoke to the shaft portion; and
a preload element that exerts a preload force on at least one of the first set of roller bearing elements and the second set of roller bearing elements, wherein the preload element is disposed on the drive pinion in an inboard direction from the yoke, the inboard direction extending along the axis from the yoke toward the gear portion, wherein the shaft portion has a first shaft end surface disposed proximate the yoke retainer and a second shaft end surface disposed opposite the first shaft end surface and the preload force is provided by axial movement of the shaft portion relative to the gear portion.

16. The axle assembly of claim 15 wherein the shaft portion and the gear portion have mating splines that permit axial positioning of the shaft portion relative to the gear portion and inhibit rotation of the gear portion with respect to the shaft portion.

17. The axle assembly of claim 15 wherein the preload element is a pinion nut that couples the gear portion to the shaft portion and is axially positioned between the gear portion and the second shaft end surface of the shaft portion.

18. The axle assembly of claim 15 wherein the preload element is a threaded fastener that has a threaded shank that is received in the shaft portion and an enlarged head that extends outwardly from the threaded shank and overlaps the gear portion, wherein tightening the threaded fastener exerts the preload force and actuates the shaft portion in the inboard direction.

19. The axle assembly of claim 15 wherein the preload element is a ring that extends around and receives the shaft portion, wherein the preload element is welded to the shaft portion or the shaft portion and the gear portion and is axially positioned between the first shaft end surface and the gear portion.

20. The axle assembly of claim 15 wherein the shaft portion includes an annular shoulder that transmits the preload force.

* * * * *